(12) United States Patent
Kouzaki et al.

(10) Patent No.: US 11,604,939 B2
(45) Date of Patent: Mar. 14, 2023

(54) COATING QUALITY PREDICTION DEVICE AND LEARNED MODEL GENERATION METHOD

(71) Applicant: TOYOTA JIDOSHA KABUSHIKI KAISHA, Toyota (JP)

(72) Inventors: Mamoru Kouzaki, Toyota (JP); Hideaki Morita, Toyota (JP); Akira Nishimura, Toyota (JP); Shin Yahiro, Toyota (JP); Kazuyuki Okazaki, Toyota (JP); Tomohiro Murai, Nagoya (JP); Daichi Nishiwaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 35 days.

(21) Appl. No.: 17/101,035

(22) Filed: Nov. 23, 2020

(65) Prior Publication Data
US 2021/0279510 A1    Sep. 9, 2021

(30) Foreign Application Priority Data

Mar. 4, 2020 (JP) .............................. JP2020-037001

(51) Int. Cl.
*G06K 9/62* (2022.01)
*G06N 20/00* (2019.01)
*C09D 5/03* (2006.01)
*G06V 40/16* (2022.01)

(52) U.S. Cl.
CPC ........... *G06K 9/6256* (2013.01); *C09D 5/035* (2013.01); *G06N 20/00* (2019.01); *G06V 40/162* (2022.01)

(58) Field of Classification Search
CPC ............. G06K 9/6256; G06K 9/00536; G06K 9/00523; C09D 5/035; G06N 20/00; G06V 40/162; G06Q 50/04; B05C 11/1005
See application file for complete search history.

(56) References Cited

U.S. PATENT DOCUMENTS

| | | | | |
|---|---|---|---|---|
| 6,081,796 | A | * | 6/2000 | Takagi .................... G06N 3/086 706/14 |
| 11,216,663 | B1 | * | 1/2022 | Ettinger ................ G05D 1/0016 |
| 2010/0136342 | A1 | * | 6/2010 | Tachi .................... B05D 3/0254 428/411.1 |
| 2015/0276485 | A1 | * | 10/2015 | Alman ..................... G01J 3/52 702/190 |
| 2015/0332127 | A1 | * | 11/2015 | Zheng .................. G06K 9/6215 382/165 |

(Continued)

FOREIGN PATENT DOCUMENTS

| | | |
|---|---|---|
| JP | 2000-246167 A | 9/2000 |
| JP | 2003-295925 A | 10/2003 |

(Continued)

*Primary Examiner* — Lewis G West
(74) *Attorney, Agent, or Firm* — Oblon, McClelland, Maier & Neustadt, L.L.P.

(57) ABSTRACT

The coating quality prediction device includes: a learned model that has learned a relationship between characteristics of a paint, conditions at a time of applying the paint, and a smoothness of a surface of a coating film obtained by applying the paint under the conditions; and a calculation unit that uses the learned model to calculate the smoothness of the surface of the coating film from the characteristics of the paint and the conditions at the time of applying the paint.

8 Claims, 8 Drawing Sheets

(56) References Cited

U.S. PATENT DOCUMENTS

| | | | |
|---|---|---|---|
| 2019/0279054 A1* | 9/2019 | Morovic | H04N 1/00031 |
| 2020/0269439 A1* | 8/2020 | Telleria | B25J 5/007 |
| 2020/0285862 A1* | 9/2020 | Pojman | G06T 5/005 |
| 2020/0311452 A1* | 10/2020 | McConnell | H04N 5/2253 |
| 2020/0349758 A1* | 11/2020 | Paulson | G06T 15/04 |
| 2020/0402307 A1* | 12/2020 | Tanwer | G06T 19/00 |
| 2021/0201513 A1* | 7/2021 | Steenhoek | G06T 7/0004 |
| 2021/0201535 A1* | 7/2021 | Steenhoek | G06T 7/90 |
| 2021/0224975 A1* | 7/2021 | Ranca | G06F 40/20 |
| 2021/0268541 A1* | 9/2021 | Okazaki | B05D 3/068 |
| 2021/0279510 A1* | 9/2021 | Kouzaki | G01N 21/8851 |
| 2021/0323167 A1* | 10/2021 | Hemes | G05B 19/41875 |
| 2022/0019204 A1* | 1/2022 | Maury | G06F 30/15 |
| 2022/0042258 A1* | 2/2022 | Dolinar | G06T 7/70 |

FOREIGN PATENT DOCUMENTS

| | | |
|---|---|---|
| JP | 2004-181316 A | 7/2004 |
| JP | 2008-509488 | 3/2008 |

* cited by examiner

LEARNING FLOW

COATING QUALITY PREDICTION DEVICE AND LEARNED MODEL GENERATION METHOD

CROSS-REFERENCE TO RELATED APPLICATION

This application claims priority to Japanese Patent Application No. 2020-037001 filed on Mar. 4, 2020, incorporated herein by reference in its entirety.

BACKGROUND

1. Technical Field

The present disclosure relates to a coating quality prediction device and a method for generating a learned model.

2. Description of Related Art

A coating method has been known in which a certain level of finished skin can be obtained (for example, see Japanese Unexamined Patent Application Publication No. 2000-246167 (JP 2000-246167 A)).

The coating method of JP 2000-246167 A is configured such that, when a change in the coating environment is detected, the coating conditions are changed in accordance with the change in the coating environment. As a result, a certain level of finished skin can be obtained, which can improve the stability of coat quality.

SUMMARY

Here, in the above coating method, it is possible to stabilize the coating quality by performing feedback control during coating on the object to be coated. However, the method cannot predict the coating quality before the coating is performed on the object to be coated.

An object of the present disclosure is to provide a coating quality prediction device that can predict coating quality before coating is performed on an object to be coated. Another object of the present disclosure is to provide a method for generating a learned model that can generate a learned model used in a coating quality prediction device that predicts coating quality.

A coating quality prediction device according to the present disclosure includes: a learned model that has learned a relationship between characteristics of a paint, conditions at a time of applying the paint, and a smoothness of a surface of a coating film obtained by applying the paint under the conditions; and a calculation unit that uses the learned model to calculate the smoothness of the surface of the coating film from the characteristics of the paint and the conditions at the time of applying the paint.

With the above configuration, the smoothness of the surface of the coating film can be predicted, so that the smoothness can be grasped in advance before the coating is performed on an object to be coated.

In the above coating quality prediction device, the learned model may have learned a relationship between the characteristics of the paint, the conditions at the time of applying the paint, and a value in each of a plurality of wavelength regions. The value is obtained by decomposing a result of measurement on the surface of the coating film obtained by applying the paint under the conditions.

In the above coating quality prediction device, the conditions at the time of applying the paint may include a direction in which a surface of an object to be coated faces.

In the above coating quality prediction device, the paint may include an intermediate paint, a base paint, and a clear paint, and the coating film may include an intermediate coating film, a base coating film provided on the intermediate coating film, and a clear coating film provided on the base coating film.

In this case, the characteristics of the base paint may be calculated based on ingredients of the base paint.

A coating quality prediction device according to the present disclosure includes: a learned model that has learned a relationship between information regarding a paint, conditions at a time of applying the paint, and a variation in a coating color among a plurality of objects to be coated on which the paint is applied under the conditions; and a calculation unit that uses the learned model to calculate the variation in the coating color from the information regarding the paint and the conditions at the time of applying the paint.

With this configuration, the variation in the coating color can be predicted, so that the variation in the coating color can be grasped in advance before the coating is performed on the objects to be coated.

In the above coating quality prediction device, the variation in the coating color may include a variation in each of values in CIE 1976 L*a*b* color system.

In the above coating quality prediction device, the information regarding the paint may include a standard color of the paint.

A method for generating a learned model according to the present disclosure includes: acquiring training data including characteristics of a paint, conditions at a time of applying the paint, and a smoothness of a surface of a coating film obtained by applying the paint under the conditions; and using the training data to generate a learned model that outputs the smoothness of the surface of the coating film when the characteristics of the paint and the conditions at the time of applying the paint are input.

A method for generating a learned model according to the present disclosure includes: acquiring training data including information regarding a paint, conditions at a time of applying the paint, and a variation in a coating color among a plurality of objects to be coated on which the paint is applied under the conditions; and using the training data to generate a learned model that outputs the variation in the coating color when the information regarding the paint and the conditions at the time of applying the paint are input.

With the coating quality prediction device according to the present disclosure, it is possible to predict the coating quality before the coating is performed on the objects to be coated. With the method for generating a learned model according to the present disclosure, it is possible to generate a learned model used in the coating quality prediction device that predicts coating quality.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described.

First Embodiment

First, the configurations of a coating quality prediction device 1 and a learning device 2 according to a first embodiment of the present disclosure will be described with reference to FIGS. 1 to 3.

The coating quality prediction device 1 (see FIG. 1) is configured to estimate the smoothness of the surface of a coating film 100 (see FIG. 3) using a learned model 12a. The learning device 2 (see FIG. 2) is configured to generate a learned model 20b for estimating the smoothness of the surface of the coating film 100. The learned model 12a stored in the coating quality prediction device 1 is the same as the learned model 20b generated by the learning device 2.

Figure 3:
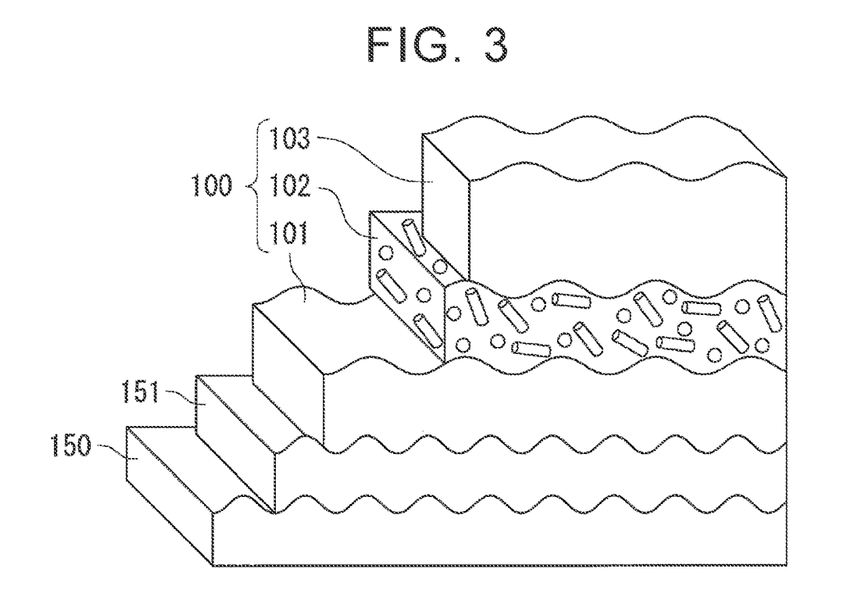
FIG. 3 is a schematic diagram showing an example of a coating film having coating quality to be predicted.

Here, as shown in FIG. 3, the coating film 100 includes, for example, an intermediate coating film 101, a base coating film 102, and a clear coating film 103, and is provided on a steel plate 150 of the vehicle body, for example. An electrodeposition coating film 151 is provided on the steel plate 150. The intermediate coating film 101 is provided on the electrodeposition coating film 151. The base coating film 102 is provided on the intermediate coating film 101. The clear coating film 103 is provided on the base coating film 102. The coating quality prediction device 1 is configured to predict the smoothness of the coating film 100 on the electrodeposition coating film 151.

The smoothness of the coating film 100 can be measured by using a smoothness measuring device (not shown). In the smoothness measuring device, the surface of the coating film 100 is irradiated with laser light from the light source, the reflected light is detected by the detector, and the surface is scanned by the light source moving along the surface, so that the brightness of reflected light is measured point by point at a predetermined interval, and the optical profile of the surface is detected. Then, the optical profile is filtered to be decomposed into a plurality of wavelength regions and converted into numbers for each wavelength region. Examples of such a smoothness measuring device include "Wave-ScanDual" manufactured by BYK-Gardner.

In the present embodiment, the optical profile is decomposed into first to fourth wavelength regions. The first wavelength region is a region on the relatively long wavelength side, and the fourth wavelength region is a region on the relatively short wavelength side. The second wavelength region and the third wavelength region are regions between the first wavelength region and the fourth wavelength region, the second wavelength region is on the long wavelength side, and the third wavelength region is on the short wavelength side. The value in the first wavelength region is an index for evaluating the undulation (waviness) of the skin of the surface of the coating film 100. The value in the fourth wavelength region is an index for evaluating the luster of the surface of the coating film 100. The value in the second wavelength region and the value in the third wavelength region are indices relating to the undulation of the skin and the luster. In the first to fourth wavelength regions, the smaller the value, the higher the smoothness. The optical profile is an example of the "result of measurement on the surface of the coating film" in the present disclosure.

Thus, the coating quality prediction device 1 is configured to estimate the value of each wavelength region using the learned model 12a. The learning device 2 is configured to generate the learned model 20b for estimating the value of each wavelength region.

Figure 2:
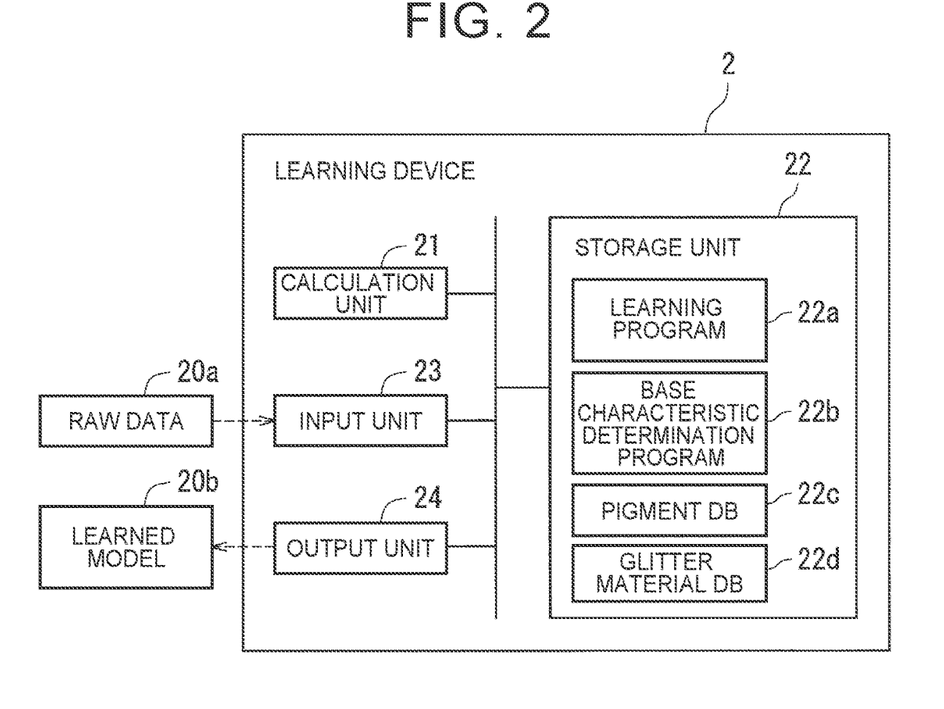
FIG. 2 is a block diagram showing a learning device according to the first embodiment.

As shown in FIG. 2, the learning device 2 is configured to preprocess raw data 20a to generate training data and generate the learned model 20b using the training data. The learning device 2 includes a calculation unit 21, a storage unit 22, an input unit 23, and an output unit 24.

The calculation unit 21 is configured to control the learning device 2 by executing a calculation process based on a program stored in the storage unit 22 or the like. The storage unit 22 stores a program, a database referred to when the program is executed, and the like. For example, the storage unit 22 stores a learning program 22a, a base characteristic determination program 22b, a pigment database (DB) 22c, and a glitter material DB 22d. The input unit 23 is configured to be able to receive an input of the raw data 20a, and the output unit 24 is configured to be able to output the learned model 20b.

The raw data 20a includes various kinds of information regarding the coating that was actually performed in the past, the evaluation result of the smoothness after the coating, and the like, which are associated with each other. The raw data 20a includes, for example, "ingredients of a paint", a "paint manufacturer name" indicating the manufacturer of the paint, "coating data" regarding coating using the paint, "coating conditions" at the time when the coating is performed using the paint, and the measurement results of the smoothness measuring device for the coating film 100 formed under such settings.

As a specific example, one record of the raw data 20a includes the following items, and the raw data 20a is composed of a number of records.

(a1) Type of intermediate paint
(a2) Color of intermediate paint
(a3) Ingredients of base paint
(a4) Type of clear paint
(b) Paint manufacturer name
(c1) Amounts of non-volatile components of base paint
(c2) Amounts of non-volatile components of clear paint
(c3) Thickness of intermediate coating film
(c4) Thickness of base coating film (c5) Thickness of clear coating film
(d1) Coating direction (direction of surface of object to be coated)
(d2) Stacking method
(d3) Coating environment
(e1) Value in first wavelength region
(e2) Value in second wavelength region
(e3) Value in third wavelength region
(e4) Value in fourth wavelength region In the above items, the "type of intermediate paint" indicates whether the intermediate paint is water-based or solvent. The "color of intermediate paint" indicates a tint. The "ingredients of base paint" indicates the composition of the paint, and is information indicating the names of the pigments and the glitter materials that are mixed in, and the mixing amounts thereof. Preprocessing (base paint characteristic determination) described later is performed using the composition of the paint. The "type of clear paint" indicates whether the clear paint is of one-component type or two-component type. The "coating direction" indicates whether the coating is performed on the object that is disposed such that the surface thereof extends to be orthogonal to the vertical direction or the coating is performed on the object that is disposed such that the surface thereof extends to be orthogonal to the horizontal direction. The "stacking method" indicates whether the stacking method is 3WET or 3C2B. 3WET is a method including baking after applying the intermediate, base and clear coatings, and 3C2B is a method including baking after applying the intermediate coating and then baking after applying the base and clear coatings. The "coating environment" indicates whether the inside of the coating booth is high temperature and high humidity, or low temperature low humidity, or standard. The "values in first to fourth wavelength regions" are the measurement results of the smoothness measuring device. It should be noted that items (a1) to (a4) are items included in the "ingredients of the paint", items (c1) to (c5) are items included in the "coating data", and items (d1) to (d3) are items included in the "coating conditions".

Further, the learning device 2 is configured to determine the "characteristics of the base paint" using the "ingredients of the base paint" and the "paint manufacturer name" of the raw data 20a. Specifically, the calculation unit 21 executes the base characteristic determination program 22b, so that the "characteristics of the base paint" are determined from the "ingredients of the base paint" and the "paint manufacturer name" with reference to the pigment DB 22c and the glitter material DB 22d. The "characteristics of the base paint" are composed of the following "characteristics of the base paint regarding pigments" and "characteristics of the base paint regarding glitter materials".

The pigment DB 22c stores information regarding pigments, and the pigment DB 22c is provided to derive the "characteristics of the base paint regarding pigments" from the "ingredients of the base paint (names and mixing amounts of pigments)" and the "paint manufacturer name". The "characteristics of the base paint regarding pigments" include, for example, the following items.
(a31) Mixing amounts of various pigments
(a32) Total mixing amount of various pigments
(a33) Viscosity coefficient of base paint The "mixing amounts of various pigments" include the following items, for example.
(a311) Mixing amount of organic red pigment
(a312) Mixing amount of inorganic red pigment
(a313) Mixing amount of organic yellow pigment
(a314) Mixing amount of inorganic yellow pigment
(a315) Mixing amount of white pigment
(a316) Mixing amount of purple pigment
(a317) Mixing amount of blue pigment
(a318) Mixing amount of black pigment
(a319) Mixing amount of maroon color pigment
(a320) Mixing amount of green pigment The glitter material DB 22d stores information regarding the glitter materials, and the glitter material DB 22d is provided to derive the "characteristics of the base paint regarding glitter materials" from the "ingredients of the base paint (names and mixing amounts of the glitter materials)" and the "paint manufacturer name". The "characteristics of the base paint regarding glitter materials" include, for example, the following items.
(a34) Mixing amounts of glitter materials for each particle size
(a35) Total mixing amount of glitter materials
(a36) Content of glitter materials in coating film
(a37) Effects of thicknesses of glitter materials
(a38) Variation in particle size of glitter materials
(a39) Weight of glitter materials The "mixing amounts of glitter materials for each particle size" include, for example, the following items.
(a341) Mixing amount of glitter material having a particle size of 0 μm to 8 μm
(a342) Mixing amount of glitter material having a particle size of 8 μm to 12 μm
(a343) Mixing amount of glitter material having a particle size of 12 μm to 16 μm
(a344) Mixing amount of glitter material having a particle size of 16 μm to 20 μm
(a345) Mixing amount of glitter material having a particle size of 20 μm to 24 μm That is, the learning device 2 is configured to calculate the "characteristics of the base paint" from the "ingredients of the base paint" and replace the "ingredients of the base paint" in the raw data 20a with the "characteristics of the base paint" for use as training data. Then, in the learning device 2, the calculation unit 21 executes the learning program 22a to generate the learned model 20b. The learned model 20b is configured to output the "values in the first to fourth wavelength regions" when the "characteristics of the paint", the "paint manufacturer name", the "coating data", and the "coating conditions" are input. The "characteristics of the paint" are composed of the "type of the intermediate paint", the "color of the intermediate paint", the "characteristics of the base paint" and the "type of the clear paint".

Here, in the learned model 20b, the "coating direction" is set as a factor that greatly contributes to the output of the "value in the first wavelength region", and the "thickness of the clear coating film" is set as a factor that greatly contributes to the output of the "value in the fourth wavelength region", which agree with past experience.

Figure 1:
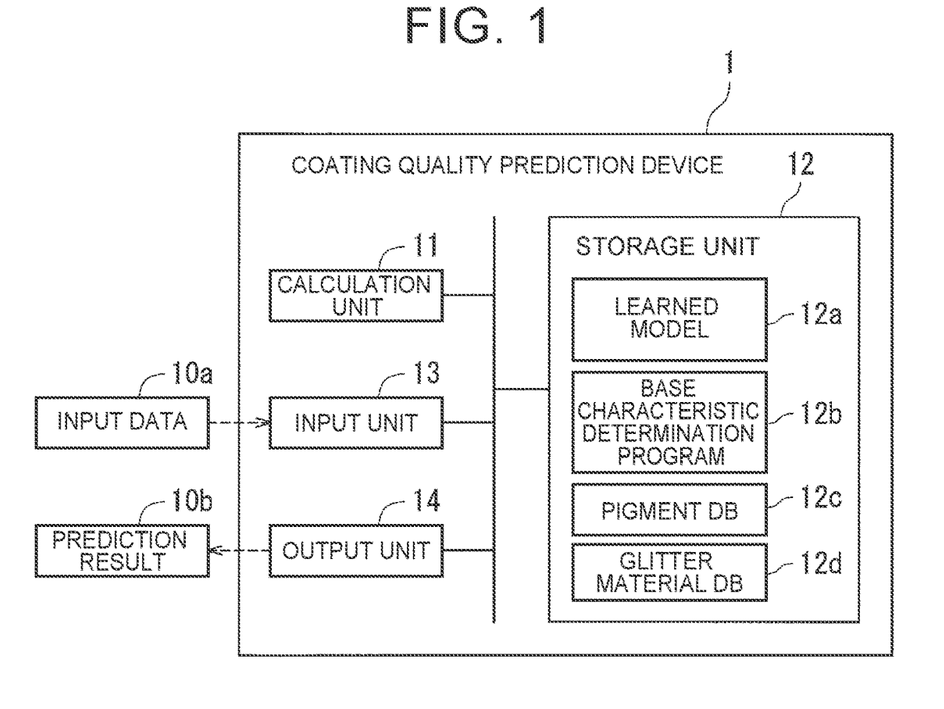
FIG. 1 is a block diagram showing a coating quality prediction device according to a first embodiment.

As shown in FIG. 1, the coating quality prediction device 1 includes the calculation unit 11, the storage unit 12, the input unit 13, and the output unit 14. The calculation unit 11 is an example of the "calculation unit" in the present disclosure.

The calculation unit 11 is configured to control the coating quality prediction device 1 by executing a calculation process based on the program stored in the storage unit 12. The storage unit 12 stores a program, a database referred to when the program is executed, and the like. For example, the storage unit 12 stores the learned model 12a, the base characteristic determination program 12b, the pigment DB 12c, and the glitter material DB 12d. The input unit 13 is configured to be able to receive an input of input data 10a, and the output unit 14 is configured to be able to output a prediction result 10b.

The base characteristic determination program 12b, the pigment DB 12c, and the glitter material DB 12d of the coating quality prediction device 1 are configured similarly to the base characteristic determination program 22b, the pigment DB 22c, and the glitter material DB 22d of the learning device 2. The input data 10a includes various kinds of information regarding coating for which smoothness is desired to be predicted. That is, the input data 10a includes, for example, the "ingredients of the paint", the "paint manufacturer name", the "coating data", and the "coating conditions".

Thus, in the coating quality prediction device 1, when the input data 10a is input, the calculation unit 11 executes the base characteristic determination program 12b, so that the "characteristics of the base paint" are determined from the "ingredients of the base paint" and the "paint manufacturer name", with reference to the pigment DB 12c and the glitter material DB 12d. The determination of the characteristics of the base paint is performed by the coating quality prediction device 1 in the same manner as the determination of the characteristics of the base paint performed by the learning device 2.

Then, the coating quality prediction device 1 uses the learned model 12a to calculate the "values in the first to fourth wavelength regions" from the "characteristics of the paint", the "paint manufacturer name", the "coating data", and the "coating conditions". The coating quality prediction device 1 outputs "the values in the first to fourth wavelength regions" as the prediction result 10b. The smaller the "values in the first to fourth wavelength regions", the smoother the surface of the coating film 100 is predicted to be.

Learning Operation

Next, with reference to FIG. 4, the learning operation (method for generating a learned model) performed by the learning device 2 of the first embodiment will be described. The following steps are executed by the calculation unit 21.

Figure 4:
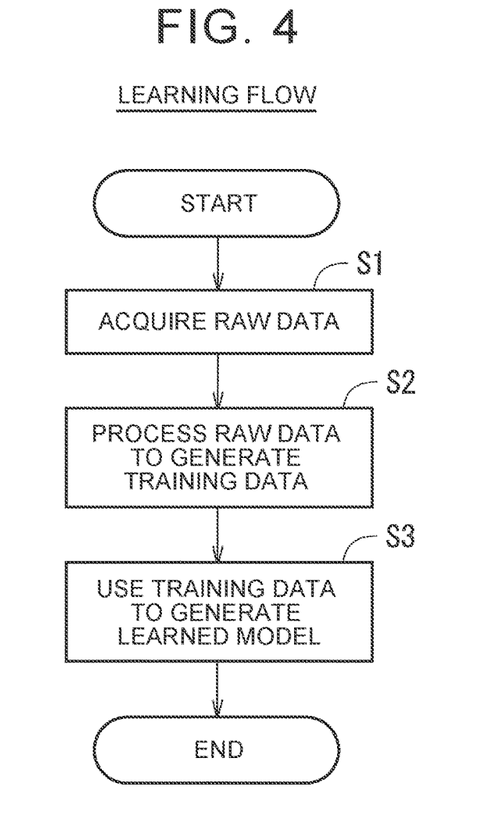
FIG. 4 is a flowchart illustrating a learning operation by the learning device of the first embodiment.

First, in step S1 of FIG. 4, the raw data 20a is acquired. The raw data 20a includes the "ingredients of the paint", the "paint manufacturer name", the "coating data", the "coating conditions", and the "values in the first to fourth wavelength regions".

Next, in step S2, the base characteristic determination program 22b is executed, so that the "characteristics of the base paint" are calculated from the "ingredients of the base paint" and the "paint manufacturer name". As a result, the training data is generated. The training data includes the "characteristics of the paint", the "paint manufacturer name", the "coating data", the "coating conditions", and the "values in the first to fourth wavelength regions", which are associated with each other.

Next, in step S3, the learning program 22a is executed, so that the learned model 20b is generated using the training data. In the learned model 20b, when the "characteristics of the paint", the "paint manufacturer name", the "coating data" and the "coating conditions" are input, the "values in the first to fourth wavelength regions" are output.

Prediction Operation

Next, with reference to FIG. 5, a coating quality prediction operation by the coating quality prediction device 1 of the first embodiment will be described. The learned model 12a is stored in the storage unit 12 of the coating quality prediction device 1. The learned model 12a is the learned model 20b generated by the learning device 2. The following steps are executed by the calculation unit 11.

Figure 5:
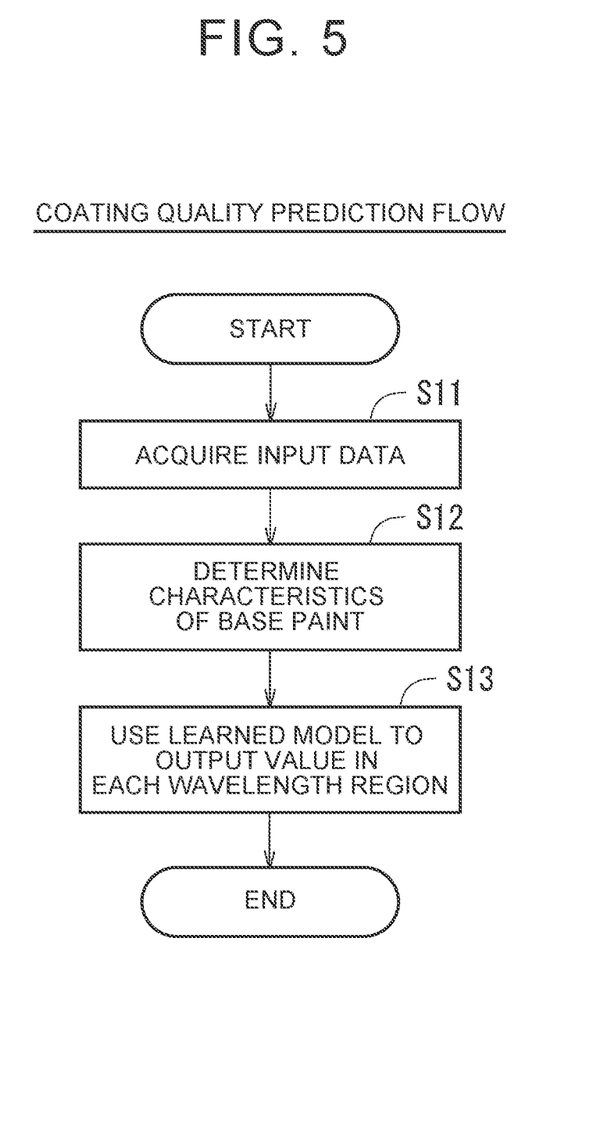
FIG. 5 is a flowchart illustrating a prediction operation by the coating quality prediction device of the first embodiment.

First, in step S11 of FIG. 5, the input data 10a is acquired. The input data 10a includes the "ingredients of the paint", the "paint manufacturer name", the "coating data", and the "coating conditions".

Next, in step S12, the base characteristic determination program 12b is executed, so that the "characteristics of the base paint" are calculated from the "ingredients of the base paint" and the "paint manufacturer name". As a result, the "ingredients of the paint" in the input data 10a is replaced with the "characteristics of the paint".

Next, in step S13, using the learned model 12a, the "values in the first to fourth wavelength regions" are calculated from the "characteristics of the paint", the "paint manufacturer name", the "coating data", and the "coating conditions".

Effects

In the first embodiment, as described above, the learned model 12a is provided that has learned the relationship between the "characteristics of the paint", the "coating conditions", etc. and the smoothness of the surface of the coating film 100 (values in the first to fourth wavelength regions). Using the learned model 12a, the smoothness of the surface of the coating film 100 is calculated from the "characteristics of the paint", the "coating conditions", etc., so that the smoothness can be grasped before the coating is performed on the objected to be coated. Therefore, it is possible to adjust the ingredients of the paint in advance to obtain a desired smoothness, which can improve the productivity.

Also, in the first embodiment, the "value in the first wavelength region" and the "value in the fourth wavelength region" are predicted, so that the undulation of the skin of the surface of the coating film 100 can be evaluated based on the "value in the first wavelength region" and the luster of the surface of the coating film 100 can be evaluated based on the "value in the fourth wavelength region".

Further, in the first embodiment, the "characteristics of the base paint" are calculated from the "ingredients of the base paint", so that it is possible to improve the prediction accuracy using the learned model 12a. For example, of the "characteristics of the base paint", the "viscosity coefficient of the base paint" is a factor that contributes relatively greatly to the outputs of the "value in the first wavelength region" and the "value in the second wavelength region". Thus, the prediction can be performed taking the factor into consideration.

In the first embodiment, the learning device 2 can generate the learned model 12a that is used in the coating quality prediction device 1 that predicts smoothness.

Second Embodiment

Next, the configurations of a coating quality prediction device 3 and a learning device 4 according to a second embodiment of the present disclosure will be described with reference to FIGS. 6, 7, and 10A to 10C.

The coating quality prediction device 3 (see FIG. 6) is configured to estimate the variation in a coating color of the coating film 100 (see FIG. 3) using a learned model 32a. The learning device 4 (see FIG. 7) is configured to generate a learned model 40b for estimating the variation in the coating color of the coating film 100. The learned model 32a stored in the coating quality prediction device 3 is the same as the learned model 40b generated by the learning device 4.

Figure 6:
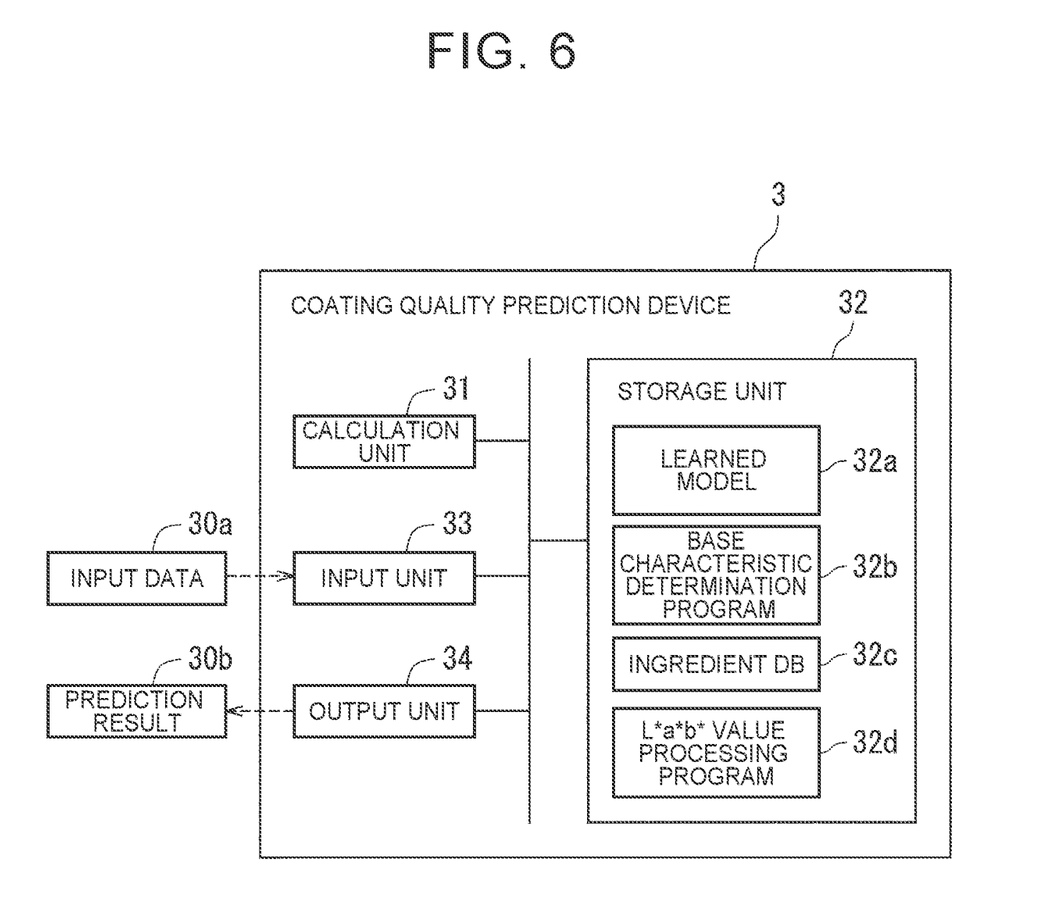
FIG. 6 is a block diagram showing a coating quality prediction device according to a second embodiment.

Here, the variation in the coating color means the variation in the coating color among a plurality of objects to be coated. In the case where coating is performed on a large number of objects to be coated (bodies, bumpers, etc.) over a long period at a manufacturing site of vehicle bodies and the like, the variation in the coating color may occur even when the coating is performed under the same conditions using the same paint. That is, it is difficult to repeatedly perform a completely consistent coating. For this reason, the coating quality prediction device 3 is configured to predict the variation in the coating color of a plurality of objects to be coated, regarding the coating repeatedly performed using the same paint under the same conditions.

The coating color of the coating film 100 can be measured using a multi-angle spectrophotometer (not shown), for example. The multi-angle spectrophotometer can measure colorimetric values in the CIE 1976 L*a*b* color system at multiple angles. L* represents lightness, and a* and b* represent chromaticity. In the present embodiment, colorimetric values in two directions, that is, the highlight direction (L*a*b*25°) and the shade direction (L*a*b*75°) are used. Examples of such a multi-angle spectrophotometer include "CM-512m3A" manufactured by Konica Minolta Japan, Inc.

Figure 7:
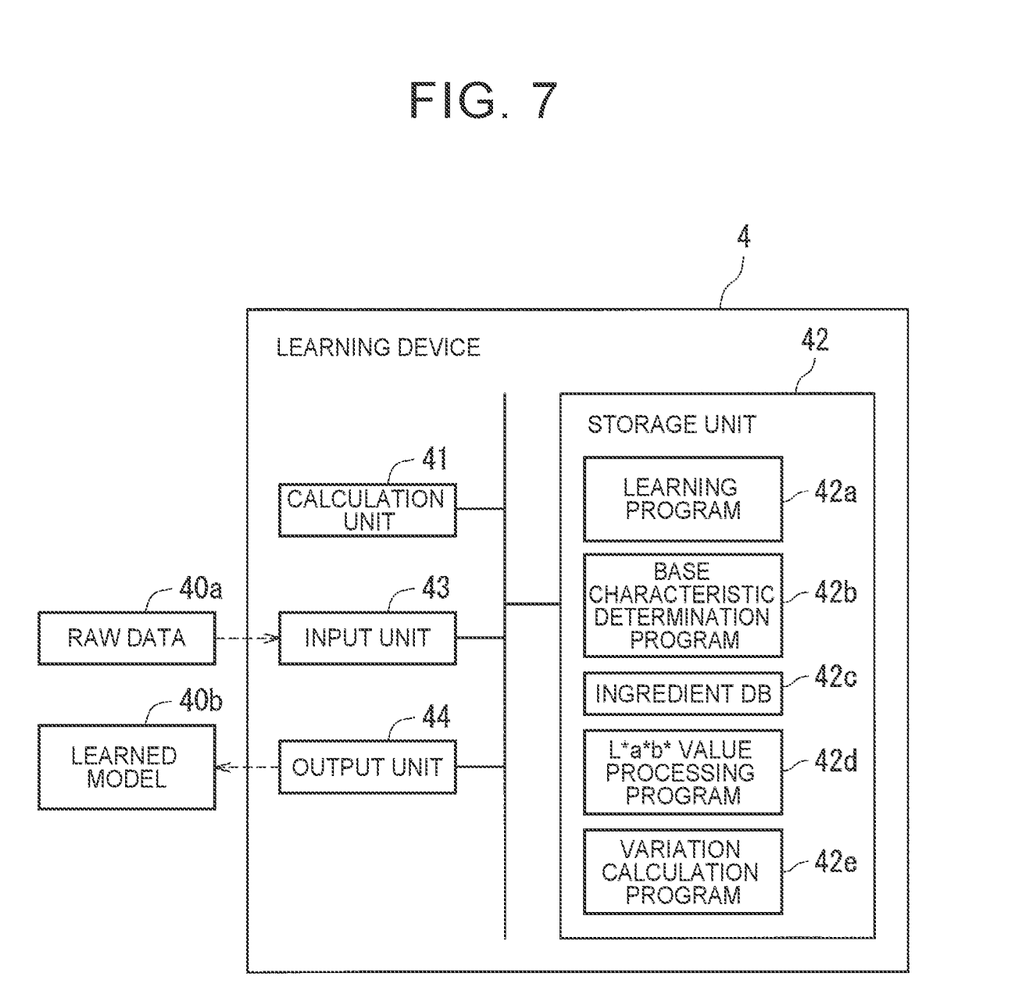
FIG. 7 is a block diagram showing a learning device according to the second embodiment.

Thus, the coating quality prediction device 3 is configured to estimate the variation in each value of L*a*b*25° and each value of L*a*b*75° using the learned model 32a. The learning device 4 is configured to generate the learned model 40b for estimating the variation in each value of L*a*b*25° and each value of L*a*b*75°.

As shown in FIG. 7, the learning device 4 is configured to preprocess raw data 40a to generate training data and generate the learned model 40b using the training data. The learning device 4 includes a calculation unit 41, a storage unit 42, an input unit 43, and an output unit 44.

The calculation unit 41 is configured to control the learning device 4 by executing a calculation process based on a program stored in the storage unit 42 or the like. The storage unit 42 stores a program, a database referred to when the program is executed, and the like. For example, the storage unit 42 stores a learning program 42a, a base characteristic determination program 42b, an ingredient DB 42c, an L*a*b* value processing program 42d, and a variation calculation program 42e. The input unit 43 is configured to be able to receive an input of the raw data 40a, and the output unit 44 is configured to be able to output the learned model 40b.

The raw data 40a includes various kinds of information regarding coating that was actually performed in the past and colorimetric results after the coating, and the like, which are associated with each other. The raw data 40a includes, for example, "paint information" that is information regarding the paint, "coating conditions" at the time when the coating is performed using the paint, and the colorimetric results of the multi-angle spectrophotometer for the coating film 100 coated under the coating conditions using the paint.

As a specific example, one record of the raw data 40a includes the following items, and the raw data 40a is composed of a number of records.
(f1) Paint manufacturer name
(f2) Layer structure of coating film
(f3) Type of intermediate paint
(f4) Ingredients of base paint
(f5) Master L*a*b* values
(g1) Production line on which coating is performed
(g2) Coated vehicle model
(g3) Coated part (body or bumper)
(h1) L*a*b* values of coated film
(i1) Date of coating In the above items, the "paint manufacturer name", the "type of intermediate paint", and the "ingredients of base paint" are the same as those in the first embodiment. The "master L*a*b* values" represent the standard color of the paint and include "L*25° value", "a*25° value", "b*25° value", and "L*75° value", "a*75° value", and "b*75° value" serving as the standard. The "L*a*b* values of coated film" are colorimetric results in the past, and include actually measured "L*25° value", "a*25° value", "b*25° value", "L*75° value", "a*75° value" and "b*75° value". It should be noted that items (f1) to (f5) are items included in the "paint information", and items (g1) to (g3) are items included in the "coating conditions".

Then, the learning device 4 is configured such that the calculation unit 41 executes a variation calculation program 42e to calculate variations in each value of L*a*b*25° and each value of L*a*b*75° from the raw data 40a. Specifically, a large number of records of the raw data 40a are grouped by common "paint information" and "coating conditions". That is, records having identical items (f1) to (f5) and (g1) to (g3) are classified into a group. Then, the records of each group are divided for each predetermined period (for example, one month) using the "date of coating", and the standard deviations and covariances of the "L*a*b* values of the coated film" for each predetermined period are calculated. Next, in each group, the standard deviation and the covariance for a predetermined period, which are median values over the entire period, are adopted as the representative values. Then, the standard deviation and covariance adopted as the representative values in each group are associated with the "paint information" and the "coating conditions" that are common to each group. That is, the "standard deviations and covariances of L*a*b*25° and 75°" are associated with the "paint information" and the "coating conditions". The "standard deviations and covariances of L*a*b*25° and 75°" are composed of the following items. The standard deviations and the covariances are used when the correlation described later is calculated.
(j1) Standard deviation of L*25°
(j2) Standard deviation of L*75°
(j3) Standard deviation of a*25°
(j4) Standard deviation of a*75°
(j5) Standard deviation of b*25°
(j6) Standard deviation of b*75°
(k1) Covariance of L*×a*25°
(k2) Covariance of L*×a*75°
(k3) Covariance of a*×b*25°
(k4) Covariance of a*×b*75°
(k5) Covariance of L*×b*25°
(k6) Covariance of L*×b*75°

Further, in the learning device 4, the calculation unit 41 executes the L*a*b* value processing program 42d to calculate the "L*a*b* processed values" from the "master L*a*b* values". The "L*a*b* processed values" include, for example, the following items.
(l1) Absolute value of a*25°
(l2) Absolute value of a*75°
(l3) Absolute value of b*25°
(l4) Absolute value of b*75°
(m1) Saturation of 25°
(m2) Saturation of 75°
(n1) Flip-flop value of L*
(n2) Flip-flop value of a*
(n3) Flip-flop value of b*

The items (l1) to (l4) represent the strength of tint. The items (n1) to (n3) represent changes due to angles. The "saturation of 25°" and the "saturation of 75°" are calculated by the following equations (1) and (2), respectively.

[Equation 1]

$$\text{Saturation of } 25° = \sqrt{(a*25°)^2 + (b*25°)^2} \quad (1)$$

$$\text{Saturation of } 75° = \sqrt{(a*75°)^2 + (b*75°)^2} \quad (2)$$

The "flip-flop value of L*", the "flip-flop value of a*", and the "flip-flop value of b*" are calculated by the following equations (3) to (5), respectively.

$$\text{Flip-flop value of } L* = L*25° - L*75° \quad (3)$$

$$\text{Flip-flop value of } a* = a*25° - a*75° \quad (4)$$

$$\text{Flip-flop value of } b* = b*25° - b*75° \quad (5)$$

Further, the learning device 4 is configured determine the "characteristics of the base paint" using the "ingredients of the base paint" and the "paint manufacturer name". Specifically, the calculation unit 41 executes the base characteristic determination program 42b, so that the "characteristics of the base paint" are determined from the "ingredients of the base paint" and the "paint manufacturer name" with reference to the ingredient DB 42c. The ingredient DB 42c stores information regarding pigments and glitter materials, and the ingredient DB 42c is provided to derive the "characteristics of the base paint" from the "ingredients of the base paint (names and mixing amounts of pigments and names and mixing amounts of glitter materials)" and the "paint manufacturer name". The "characteristics of the base paint" include, for example, the following items.

(o1) Mixing amount index of red pigment
(o2) Mixing amount index of yellow pigment
(o3) Mixing amount index of blue pigment
(o4) Mixing amount index of white pigment
(o5) Mixing amount index of black pigment
(o6) Mixing amount index of metallic pigment
(o7) Mixing amount index of mica pigment
(p1) Sum of squares of particle size of glitter material Thus, the learning device 4 is configured to perform the calculation of variation, the processing of the master L*a*b* values, and the determination on the characteristics of the base paint as preprocessing. Then, the "standard deviations and covariances of L*a*b*25° and 75°" and the "L*a*b* processed values" obtained in the preprocessing are associated with the "paint information" and the "coating conditions", and the "ingredients of the base paint" are replaced with the "characteristics of the base paint" to generate the training data. Next, in the learning device 4, the calculation unit 41 executes the learning program 42a to generate the learned model 40b. The learned model 40b is configured, when the "paint information" in which the "ingredients of the base paint" are replaced with the "characteristics of the base paint", the "coating conditions" and the "L*a*b* processed values" are input, to output the "standard deviations and covariances of the L*a*b*25° and 75°".

As shown in FIG. 6, the coating quality prediction device 3 includes the calculation unit 31, the storage unit 32, the input unit 33, and the output unit 34. The calculation unit 31 is an example of the "calculation unit" in the present disclosure.

The calculation unit 31 is configured to control the coating quality prediction device 3 by executing a calculation process based on the program stored in the storage unit 32. The storage unit 32 stores a program, a database referred to when the program is executed, and the like. For example, the storage unit 32 stores the learned model 32a, a base characteristic determination program 32b, an ingredient DB 32c, and an L*a*b* value processing program 32d. The input unit 33 is configured to be able to receive an input of input data 30a, and the output unit 34 is configured to be able to output a prediction result 30b.

The base characteristic determination program 32b, the ingredient DB 32c and the L*a*b* value processing program 32d of the coating quality prediction device 3 are configured similarly to the base characteristic determination program 42b, the ingredient DB 42c and the L*a*b* value processing program 42d of the learning device 4. The input data 30a includes various kinds of information regarding coating for which the variation in the coating color is desired to be predicted. That is, the input data 30a includes, for example, the "paint information" and the "coating conditions".

Thus, in the coating quality prediction device 3, when the input data 30a is input, the calculation unit 31 executes the base characteristic determination program 32b, so that the "characteristics of the base paint" are determined from the "ingredients of the base paint" and the "paint manufacturer name", with reference to the ingredient DB 32c. Further, in the coating quality prediction device 3, when the input data 30a is input, the calculation unit 31 executes the L*a*b* value processing program 32d to calculate the "L*a*b* processed values". The determination of the characteristics of the base paint and the processing of the L*a*b* values are performed by the coating quality prediction device 3 in the same manner as the determination of the characteristics of the base paint and the processing of the L*a*b* values performed by the learning device 4.

The coating quality prediction device 3 is configured to calculate the "standard deviations and covariances of the L*a*b*25° and 75°" from the "paint information" in which the "ingredients of the base paint" are replaced with the "characteristics of the base paint", the "coating conditions", and the "L*a*b* processed values" using the learned model 32a.

Figure 10A:
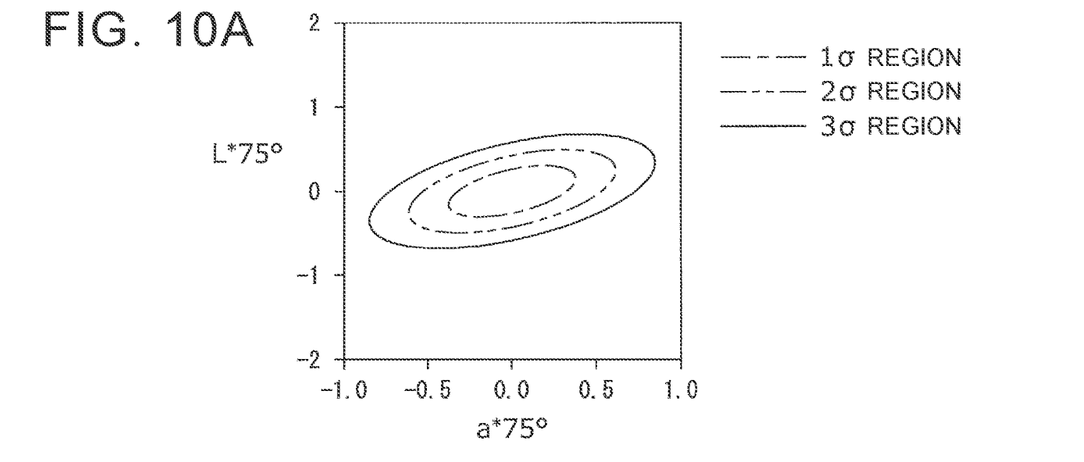
FIG. 10A is a diagram illustrating a prediction result of the coating quality prediction device of the second embodiment.
Figure 10B:
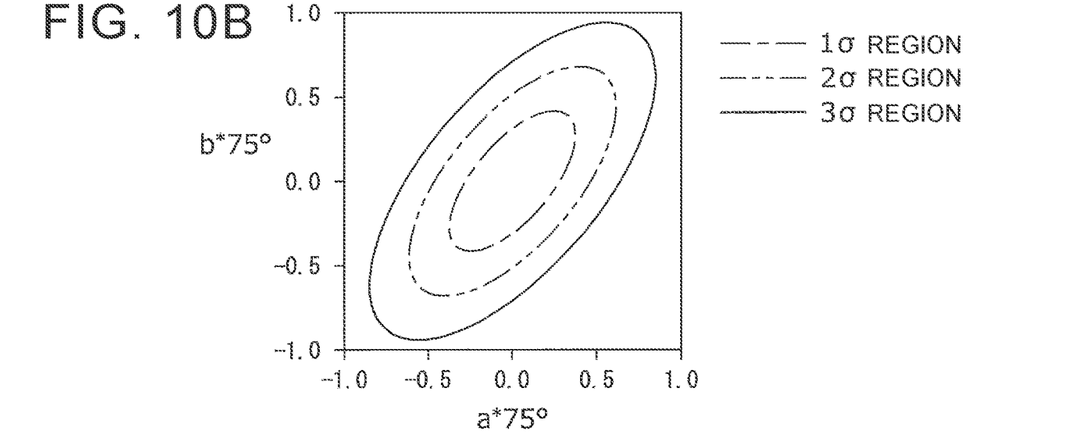
FIG. 10B is a diagram illustrating a prediction result of the coating quality prediction device of the second embodiment.
Figure 10C:
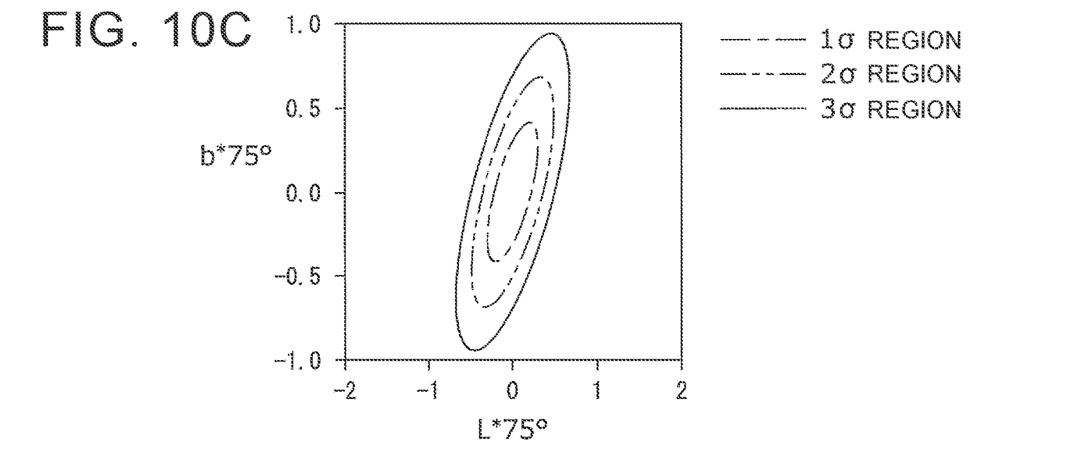
FIG. 10C is a diagram illustrating a prediction result of the coating quality prediction device of the second embodiment.

The coating quality prediction device 3 is configured to calculate the correlations using the "standard deviations and covariances of the L*a*b*25° and 75°". Specifically, the correlation of L*a*75° shown in FIG. 10A is calculated from the "covariance of L*×a*75°", the "standard deviation of L*75°", and the "standard deviation of a*75°". The correlation of a*b*75° shown in FIG. 10B is calculated from the "covariance of a*×b*75°", the "standard deviation of a*75°", and the "standard deviation of b*75°". The correlation of L*b*75° shown in FIG. 10C is calculated from the "covariance of L*×b*75°", the "standard deviation of L*75°", and the "standard deviation of b*75°". Similarly, the correlation of L*a*25° is calculated from "L*×a*25° covariance", "L*25° standard deviation", and "a*25° standard deviation". The correlation of a*b*25° is calculated from the "covariance of a*×b*25°", the "standard deviation of a*25°", and the "standard deviation of b*25°". The correlation of L*b*25° is calculated from the "covariance of L*×b*25°", the "standard deviation of L*25°", and the "standard deviation of b*25°". These correlations are, for example, the prediction result 30b, and the prediction result 30b is output to a display (not shown) or the like.

In each graph of the examples of FIGS. 10A to 10C, an elliptical region surrounded by a long dashed short dashed line is a region within which the calculated correlation falls with a probability of about 68.3%, and an elliptical region surrounded by a long dashed double-short dashed line is a region within which the calculated correlation falls with a probability of about 95.5%, and an elliptical region surrounded by a continuous line is a region within which the calculated correlation falls with a probability of about 99.7%. Therefore, it is predicted that the smaller the elliptical region, the smaller the variation in the coating color.

Learning Operation

Next, with reference to FIG. 8, the learning operation (method for generating a learned model) by the learning device 4 of the second embodiment will be described. The following steps are executed by the calculation unit 41.

Figure 8:
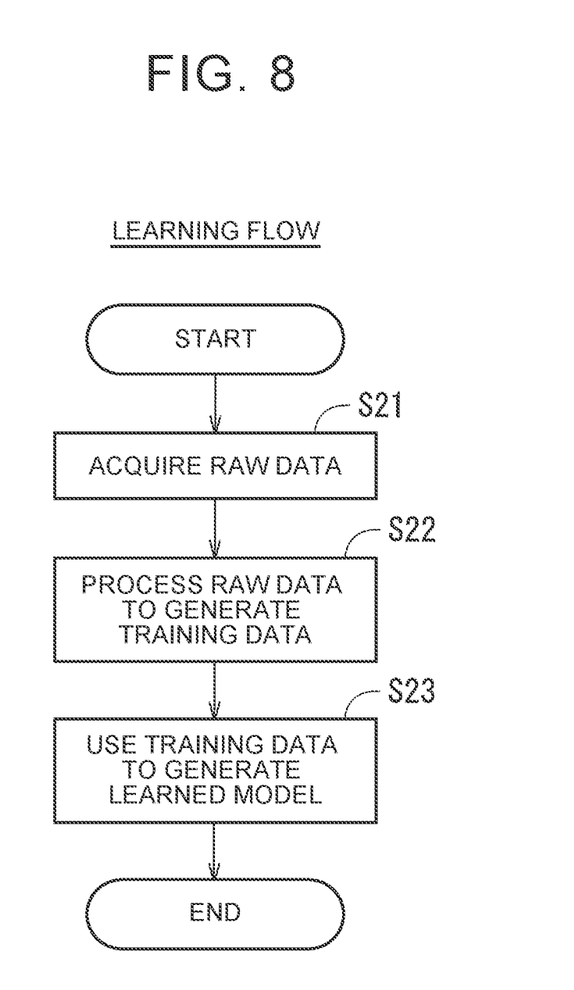
FIG. 8 is a flowchart illustrating a learning operation by the learning device of the second embodiment.

First, in step S21 of FIG. 8, the raw data 40a is acquired. The raw data 40a includes the "paint information", the "coating conditions", the "L*a*b* values of the coated film", and the like.

Next, in step S22, the raw data 40a is processed to generate the training data. Specifically, the variation calculation program 42e is executed, so that the "standard deviations and covariances of L*a*b*25° and 75°" are calculated. Further, the L*a*b* value processing program 42d is executed, so that the "L*a*b* processed values" are calculated. In addition, the base characteristic determination program 42b is executed, so that the "characteristics of the base paint" are calculated. The training data is generated using the above. The training data includes the "paint information" in which the "ingredients of the base paint" are replaced with the "characteristics of the base paint", the "coating conditions", the "L*a*b* processed values" and the "standard deviations and covariances of the L*a*b*25° and 75°", which are associated with each other.

Next, in step S23, the learning program 42a is executed, so that the learned model 40b is generated using the training data. When the "paint information" in which the "ingredients of the base paint" are replaced with the "characteristics of the base paint", the "coating conditions" and the "L*a*b* processed values" are input, the learned model 40b outputs the "standard deviations and covariances of the L*a*b*25° and 75°".

Prediction Operation

Next, with reference to FIG. 9, a coating quality prediction operation by the coating quality prediction device 3 according to the second embodiment will be described. The learned model 32a is stored in the storage unit 32 of the coating quality prediction device 3, and the learned model 32a is the learned model 40b generated by the learning device 4. The following steps are executed by the calculation unit 31.

Figure 9:
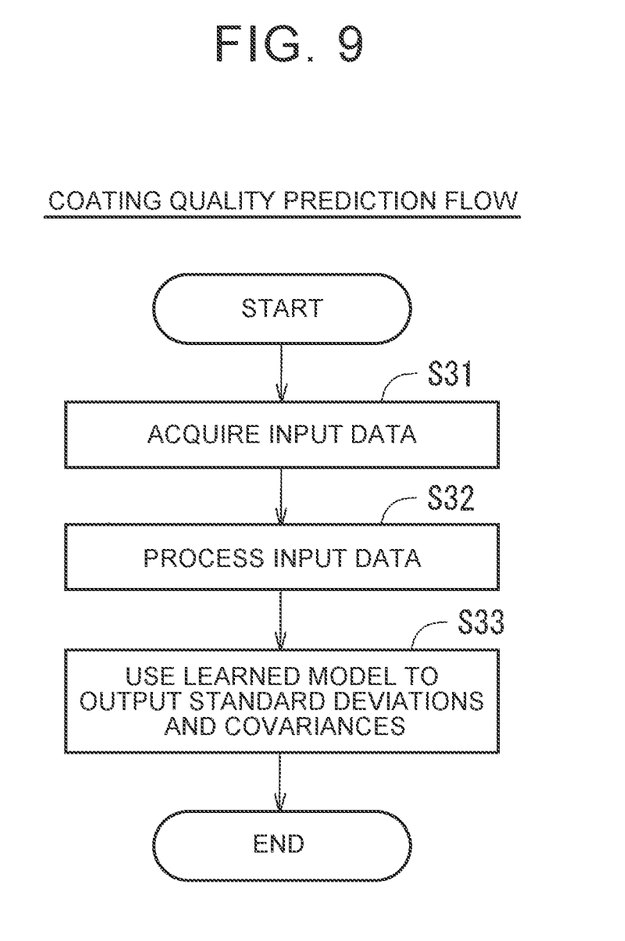
FIG. 9 is a flowchart illustrating a prediction operation by the coating quality prediction device of the second embodiment.

First, in step S31 of FIG. 9, the input data 30a is acquired. The input data 30a includes the "paint information" and the "coating conditions".

Next, in step S32, the input data 30a is processed. Specifically, the L*a*b* value processing program 32d is executed, so that the "L*a*b* processed values" are calculated. In addition, the base characteristic determination program 32b is executed, so that the "characteristics of the base paint" are calculated.

In step S33, the "standard deviations and covariances of the L*a*b*25° and 75°" are calculated from the "paint information" in which the "ingredients of the base paint" are replaced with the "characteristics of the base paint", the "coating conditions", and the "L*a*b* processed values" using the learned model 32a. Then, the correlations are calculated using the "standard deviations and covariances of L*a*b*25° and 75°".

Effects

In the second embodiment, as described above, the learned model 32a is provided that has learned the relationship between the "paint information", the "coating conditions", etc. and the variation in the coating color of the coating film 100. Using the learned model 32a, the variation in the coating color of the coating film 100 is calculated from the "paint information" and the "coating conditions", so that the variation in the coating color can be grasped before the coating is performed on the objected to be coated. Therefore, it is possible to adjust the ingredients of the paint in advance to obtain a desired variation, which can improve the productivity.

Further, in the second embodiment, the correlations are calculated from the "standard deviations and covariances of L*a*b*25° and 75°", so that the correlations of the parameters can be grasped. That is, in addition to the degree of variation, the tendency of variation can be grasped.

Further, in the second embodiment, it is possible to grasp the variation in the coating color at the body and the variation in the coating color at the bumper, for example, by predicting the variation in the coating color for each part to be coated. Therefore, it is possible to adjust the ingredients of the paint and the like in advance considering the overall finished quality.

Further, in the second embodiment, the learning device 4 can generate the learned model 32a used in the coating quality prediction device 3 that predicts the variation in the coating color.

Other Embodiments

The embodiments disclosed herein are illustrative in all respects, and do not constitute a basis for a limited interpretation. Thus, the technical scope of the present disclosure should not be construed only by the above-described embodiments, but should be defined based on the claims. The technical scope of the present disclosure includes all modifications within the meaning and the scope equivalent to those of the claims.

For example, in the first embodiment, the example is shown in which the coating film 100 has a three-layer structure, but the present disclosure is not limited to this, and the coating film may have any number of layers. For example, the clear coating film may be composed of two layers. The same applies to the second embodiment.

Further, in the first embodiment, the example is shown in which the coating film 100 is provided on the steel plate 150 of the vehicle body, but the present disclosure is not limited to this, and the coating film may be provided on a portion other than the vehicle body or may be provided on objects other than the steel plate. The same applies to the second embodiment.

Further, in the first embodiment, the example is shown in which "the values in the first to fourth wavelength regions" are estimated, but the present disclosure is not limited to this, and at least one of the "values in the first to fourth wavelength regions" may be estimated. For example, only the "value in the first wavelength region", which is an index for evaluating the undulation of the skin, may be estimated, or only the "value in the fourth wavelength region", which is an index for evaluating the luster, may be estimated. Alternatively, both the "value in the first wavelength region" and the "value in the fourth wavelength region" may be estimated.

Further, in the first embodiment, the example is shown in which the preprocessing of the raw data 20a is performed by the learning device 2, but the present disclosure is not limited to this, and the preprocessing may be performed by a device different from the learning device and the training data after preprocessing may be input to the learning device. The same applies to the second embodiment.

In addition, in the second embodiment, the example is shown in which the variation in each value in the CIE 1976 L*a*b* color system is learned to perform the prediction, but the present disclosure is not limited to this, and the variation in other color systems may be learned to perform the prediction.

In addition, in the second embodiment, the example is shown in which the variation is learned using each value of L*a*b*25° and 75° to perform the prediction, but the present disclosure is not limited to this, and the variation may be learned using other values to perform the prediction.

In the second embodiment, the example is shown in which the standard deviations and the covariances are estimated, the correlations are calculated from the standard deviations and the covariances, and the correlations are output as the prediction result 30b. However, the present disclosure is not limited to this. Alternatively, only the standard deviations may be estimated and the standard deviations may be output as the prediction result.

Further, in the second embodiment, the example is shown in which the standard deviations and covariances of a predetermined period, which are the median values over the entire period, are adopted, but the method for determining the standard deviations and covariances is not limited to this. For example, the standard deviations and covariances over the entire period may be calculated.

The present disclosure is applicable to a coating quality prediction device and a method for generating a learned model.

What is claimed is:

1. A coating quality prediction device comprising:
    a learned model that has learned a relationship between characteristics of a paint, conditions at a time of applying the paint, and a smoothness of a surface of a coating film obtained by applying the paint under the conditions; and
    a calculation unit that, before any coating is applied to an object, uses the learned model to calculate the predicted smoothness of the surface of the coating film on the object from the characteristics of the paint and the conditions at the time of applying the paint,
    wherein the learned model has learned a relationship between the characteristics of the paint, the conditions at the time of applying the paint, and a value in each of a plurality of wavelength regions, the value being obtained by decomposing a result of measurement on the surface of the coating film obtained by applying the paint under the conditions, and wherein:
    the paint includes an intermediate paint, a base paint, and a clear paint;
    the coating film includes an intermediate coating film, a base coating film provided on the intermediate coating film, and a clear coating film provided on the base coating film;
    the characteristics of the paint include characteristics of the base paint;
    the characteristics of the base paint include a viscosity coefficient of the base paint;
    the plurality of wavelength regions includes a first wavelength region, a second wavelength region, a third wavelength region, and a fourth wavelength region;
    the first wavelength region, the second wavelength region, the third wavelength region, and the fourth wavelength region are different from each other; and
    the viscosity coefficient of the base paint is a factor that contributes to the outputs of the value in the first wavelength region and the value in the second wavelength region, and calculation of the predicted smoothness of the surface of the coating film on the object takes the viscosity coefficient into consideration.

2. The coating quality prediction device according to claim 1, wherein the conditions at the time of applying the paint include a direction in which a surface of an object to be coated faces.

3. The coating quality prediction device according to claim 1, wherein the characteristics of the base paint are calculated based on ingredients of the base paint.

4. The coating quality prediction device of claim 1, wherein:
    the learned model has additionally learned a relationship between information regarding a paint, conditions at a time of applying the paint, and a variation in a coating color among a plurality of objects to be coated on which the paint is applied under the conditions; and
    the calculation unit additionally uses the learned model to calculate the variation in the coating color from the information regarding the paint and the conditions at the time of applying the paint.

5. The coating quality prediction device according to claim 4, wherein the variation in the coating color includes a variation in each of values in CIE 1976 L*a*b* color system.

6. The coating quality prediction device according to claim 4, wherein the information regarding the paint includes a standard color of the paint.

7. A method for generating a learned model, the method comprising:
    acquiring training data including characteristics of a paint, conditions at a time of applying the paint, and a smoothness of a surface of a coating film obtained by applying the paint under the conditions; and
    using the training data to generate a learned model that, before any coating is applied to an object, outputs the predicted smoothness of the surface of the coating film on the object when the characteristics of the paint and the conditions at the time of applying the paint are input,
    wherein the learned model learns a relationship between the characteristics of the paint, the conditions at the time of applying the paint, and a value in each of a plurality of wavelength regions, the value being obtained by decomposing a result of measurement on the surface of the coating film obtained by applying the paint under the conditions, and wherein:
    the paint includes an intermediate paint, a base paint, and a clear paint;
    the coating film includes an intermediate coating film, a base coating film provided on the intermediate coating film, and a clear coating film provided on the base coating film;
    the characteristics of the paint include characteristics of the base paint;
    the characteristics of the base paint include a viscosity coefficient of the base paint;
    the plurality of wavelength regions includes a first wavelength region, a second wavelength region, a third wavelength region, and a fourth wavelength region;
    the first wavelength region, the second wavelength region, the third wavelength region, and the fourth wavelength region are different from each other; and
    the viscosity coefficient of the base paint is a factor that contributes to the outputs of the value in the first wavelength region and the value in the second wavelength region, and calculation of the predicted smoothness of the surface of the coating film on the object takes the viscosity coefficient into consideration.

8. The method for generating a learned model of claim 7, the method further comprising:
    acquiring training data including information regarding a paint, conditions at a time of applying the paint, and a variation in a coating color among a plurality of objects to be coated on which the paint is applied under the conditions; and
    using the training data to generate a learned model that outputs the variation in the coating color when the information regarding the paint and the conditions at the time of applying the paint are input.

* * * * *